Jan. 12, 1960 A. KÉPÈS ET AL 2,920,495
CHANGE SPEED ARRANGEMENT
Filed April 20, 1956
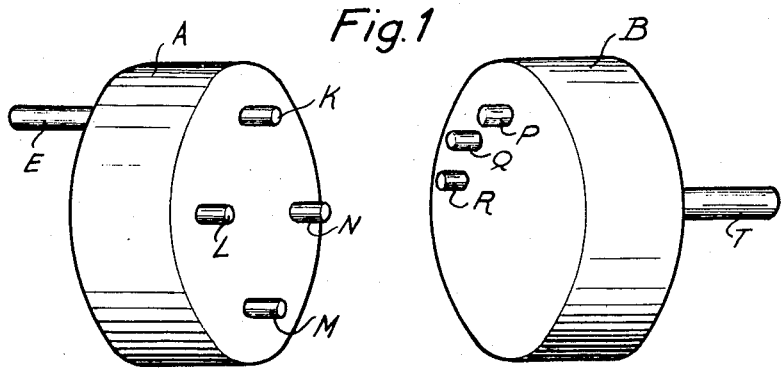
Fig. 1
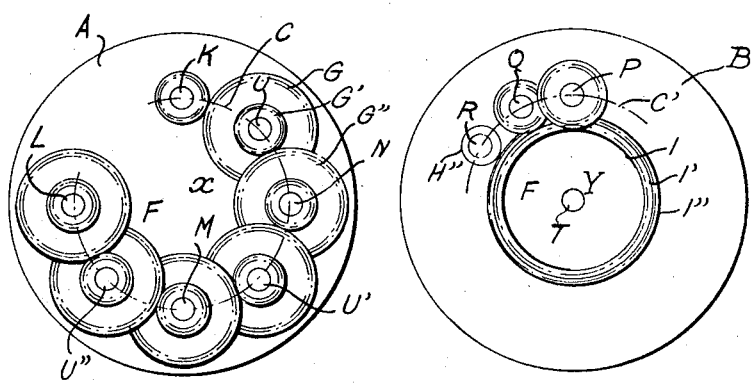
Fig. 2     Fig. 3
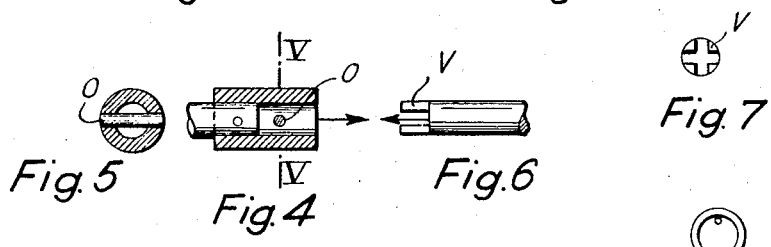
Fig. 5   Fig. 4   Fig. 6   Fig. 7
Fig. 9   Fig. 8   Fig. 10   Fig. 11
Inventors:
André KEPES
Nicolas BRODY
by: J. Delattre-Seguy
Attorney

United States Patent Office 2,920,495
Patented Jan. 12, 1960

2,920,495

CHANGE SPEED ARRANGEMENT

André Képès, Saint-Mande, and Nicolas Brody, Paris, France

Application April 20, 1956, Serial No. 579,673

Claims priority, application France April 21, 1955

9 Claims. (Cl. 74—325)

The present invention relates to a change speed arrangement, more particularly meant for laboratory and industrial equipments, such as stirrers, unwinders, etc. whenever the requirements call for a great number of different speeds supplied by a strong device, easy to operate.

The object of this invention is to provide a change speed arrangement allowing to have an output driven shaft at one or several rotation speeds from an input drive shaft rotating at constant speed.

A further object of this invention is to provide a change speed arrangement very strong and of small sizes, which may be designed for every desired output, and that will advantageously replace all the systems known up to now and embodying gear transfers, selector gears, multiple input and/or output shafts and also the electric devices provided with adjustable resistors and the like.

This change speed arrangement comprising a drive shaft and at least one driven shaft, at least one gear secured onto each of these shafts, and intermediate or auxiliary gears meshing with the gear of each of said shafts, is substantially characterized by the fact that the drive shaft, its gear, some of the intermediate gears build up a first unit which can be separated from the driven shaft, its gear and the remaining intermediate gears, these building up themselves a second unit.

Other features and advantages of the invention will appear from the following specification and from the appended drawing, in which:

Fig. 1 is a perspective view showing the two casings constituting the change speed arrangement;

Figs. 2 and 3 diagrammatically show the disposition of the gears arranged in the first and second casings respectively;

Figs. 4 through 11 are detailed illustrations of the means for coupling the shafts.

With reference to the drawing, the change speed arrangement according to the invention is made of two casing A and B (Fig. 1). The casing A is provided with a drive shaft E extending from one of the faces of said casing, whereas its opposite face is provided with intermediate shafts K, L, M, N, . . . whatever the number of them may be. The drive shaft E is preferably arranged extending from the intermediate shaft K, whereas the shafts L, M, N, . . . are coupled to the shaft K through a set of double gears G, G', G'', etc. . . . (Fig. 2), according to a suitable ratio, and arranged within a circular line C, the radius F of which starts from the centre X of the casing. The arrangement of the coupled gears allows every shaft K, L, M, N, to rotate in the same direction.

The casing B (Figs 1 and 3) is inwardly provided with gears H, H', H'', . . . integral respectively with auxiliary shafts P, Q, R, . . . arranged within a circular line C', the radius of which is equal to that of the previous casing, starting from the centre Y of said casing B. The gears H, H', H'', . . . mesh respectively with concentric gears I, I', I'', . . . integral with a driven shaft T.

Selecting a speed takes place in coupling one of said intermediate shafts from the casing A with one of the auxiliary shafts from casing B, in bringing them to face each other, and having one of the casings rotate with relation to the other around their axis X or Y. The speed modifying device thus constituted will therefore be provided with a drive shaft E and a driven shaft T.

Coupling of the various shafts may be accomplished through any suitable means as illustrated in Figs. 4 through 7, which show a first example of coupling arrangement through transverse axis O (Figs. 4 and 5), with forks or V shaped cross-parts (Figs. 6 and 7), while in another example, the coupling is accomplished through the end section of a hollow shaft engaging a cylindrical recess machined in the end section of the other shaft (Fig. 8), thus providing perfect coaxiality of the two shafts. Driving occurs by means of two pins, each of which are secured in the end section recess of the corresponding shaft, at equal distance from the geometrical axis for each shaft (Figs. 8 and 9 on the one hand, and 10 and 11 on the other).

Rather important transfers are obtained inside the casing A through intermediate shafts U, U', U'', arranged between K and N, and M and L, by means of double gears G, G', G'', shown by their original circle (Fig. 2). This arrangement allows also to have the intermediate shafts rotate in the same direction.

Due to the fact that the ratios are smaller for the casing B, it will be possible to have the three gears P, Q and R engage directly the concentric gears I, I' and I'', integral with the driven shaft T (Fig. 3).

One of the particularly interesting advantages of the invention is the fact that all the gears always remain engaged and that there is no hazard, as far as they are concerned, during speed transfer operation.

It is obvious that without departing from the scope of the present invention, it is possible to modify in many ways the embodiments which have been described hereinabove.

What we claim is:

1. A change speed arrangement comprising in combination: a drive shaft; a plurality of intermediate shafts and connected intermediate gears; one of said intermediate shafts extending from said drive shaft; a drive gear mounted on said intermediate shaft; a plurality of sets of double gears coupling said intermediate gears together and with said drive gear according to predetermined different gear ratios; all said intermediate shafts and the shafts of said double gears having their axis on one circumference; said drive shaft, said drive gear, said intermediate shafts and gears and said sets of double gears forming a first assemblage; a main driven shaft; a plurality of auxiliary driven shafts; a plurality of driven gears, one of said driven gears being mounted on each one of said auxiliary driven shafts; a second gear means mounted on said main driven shaft, each gear of said second gear means meshing with one of said driven gears; said auxiliary driven shafts, said driven gears, said second gear means and said main driven shaft forming a second assemblage; said first and second assemblages being juxtaposed for coupling one of said intermediate shafts with one of said auxiliary driven shafts, said assemblages being separable without taking to pieces each of said assemblages.

2. Change speed arrangement as claimed in claim 1, wherein said first assemblage is closed in a first casing, the ends of said intermediate shafts extending out of said casing.

3. Change speed arrangement as claimed in claim 1, wherein said drive shaft is coaxial with one of said intermediate shafts.

4. A change speed arrangement comprising in combination: a drive shaft; a plurality of intermediate shafts and connected intermediate gears; one of said intermediate shafts extending from said drive shaft; a drive gear mounted on said intermediate shaft; a plurality of sets of double gears coupling said intermediate gears together and with said drive gear according to predetermined different gear ratios; said intermediate shafts and the shafts of said double gears having their axis on one first circumference; said drive shaft, said drive gear, said intermediate shafts and gears and said sets of double gears forming a first assemblage; a main driven shaft; a plurality of auxiliary driven shafts having their axes on one second circumference; one driven gear mounted on each said auxiliary driven shaft; concentric gear means mounted on said main driven shaft, each gear of said gear means meshing with a driven gear; said auxiliary driven shafts, said driven gears, said concentric gear means and said main driven shaft forming a second assemblage separated from said first assemblage; said first and second assemblages being juxtaposed for coupling one of said intermediate shafts with one of said auxiliary driven shafts; said assemblages being separable to permit uncoupling said coupled intermediate shaft and auxiliary driven shaft without taking to pieces either of said assemblages.

5. A change speed arrangement as claimed in claim 4, in which the axis of said main driven shaft is at the center of said second circumference, the diameter of said second circumference being equal to the diameter of said first circumference.

6. Change speed arrangement as claimed in claim 4, wherein said second assemblage is closed in a second casing, the ends of said auxiliary shafts extending out of said second casing.

7. Change speed arrangement as claimed in claim 1, wherein the ends of said intermediate shafts and auxiliary shafts extend between said first and second assemblages and are provided with coupling means for coupling one end of said intermediate shafts with one end of said auxiliary shafts.

8. Change speed arrangement as claimed in claim 7, wherein the angular position of said intermediate shafts are chosen, so as to permit only one coupling between one of said intermediate shafts and one of said auxiliary shafts.

9. A change speed arrangement as claimed in claim 1, in which said first assemblage is enclosed in a first casing; said second assemblage is enclosed in a second casing separate from said first casing; and the ends of said intermediate shafts and of said auxiliary shafts extend respectively out of said first and second casings between said casings, to permit said coupling.

References Cited in the file of this patent

UNITED STATES PATENTS

| | | |
|---|---|---|
| 704,645 | Isler | July 15, 1902 |
| 1,462,675 | Whittington | July 24, 1923 |
| 2,694,938 | Green et al. | Nov. 23, 1954 |